United States Patent [19]

Ziman et al.

[11] Patent Number: 4,477,829
[45] Date of Patent: Oct. 16, 1984

[54] METHOD OF OBTAINING MULTIZONE IMAGES OF OBJECTS AND MULTIZONE SYSTEM THEREFOR

[75] Inventors: Yan L. Ziman; Vladimir A. Kottsov; Jury M. Chesnokov; Boris S. Dunaev; Alexei N. Drokhanov; Klavdia A. Kraush; Stanislav D. Barabanov, all of Moscow, U.S.S.R.

[73] Assignee: Institut Kosmicheskikh Issledovany Akademii Nauk SSSR, Moscow, U.S.S.R.

[21] Appl. No.: 295,133

[22] Filed: Aug. 21, 1981

[51] Int. Cl.³ .................... H04N 9/02; H04N 7/18; G06K 9/46; G06K 9/76
[52] U.S. Cl. .................................. 358/1; 358/109; 358/208; 382/17; 382/31
[58] Field of Search ................ 358/109, 106, 107, 81, 358/1, 21 R, 41, 206, 208; 356/71; 340/146.3 P; 350/162 SF, 162.12, 162.13, 162.14; 364/515; 382/31, 17; 343/5 MM

[56] References Cited

U.S. PATENT DOCUMENTS

| | | | |
|---|---|---|---|
| 3,497,704 | 2/1970 | Holmes et al. | 382/31 |
| 3,829,218 | 8/1974 | Alyanak | 356/71 |
| 4,330,775 | 5/1982 | Iwamoto et al. | 356/71 |
| 4,360,799 | 11/1982 | Leighty et al. | 382/31 |

OTHER PUBLICATIONS

Avanessov, Russian Article: Operational Means for Obtaining Cosmic Video Information in an Optical Range in the book "Space Exploration of Mineral Resources", Moscow, 1976, pp. 24-35 (fragment) & translation.
Thompson, "Hybrid Processing Systems-An Assessment", Proc. of the IEEE, vol. 65, No. 1, Jan. 1977, pp. 62-76.
Nisenson et al., "Real Time Optical Processing with $Bi_{12}SiO_{20}$ PROM", Applied Optics, vol. 11, No. 12, Dec. 1972, pp. 2760-2767.
Almeida et al., "A Real Time Hybrid Optical System for Pattern Recognition Applications", IEEE Trans. on Inst. and Meas., vol. IM-26, No. 4, Dec. 1977, pp. 312-316.
Lendaris et al., "Diffraction Pattern Sampling for Automatic Pattern Recognition", Proc. of the IEEE, vol. 58, No. 2, Feb. 1970, pp. 198-216.
Chesnokov, "Photographic Methods of Exploring the Earth from Outer Space", Space Exploration of Mineral Resources, Moscow, 1976, pp. 16-23.
Drokhanov, "Problems Relating to Recording and Displaying of Video Information", Space Exploration of Mineral Resources, Moscow, 1976, pp. 188-209.

Primary Examiner—John C. Martin
Attorney, Agent, or Firm—Robert E. Burns; Emmanuel J. Lobato; Bruce L. Adams

[57] ABSTRACT

A method of obtaining multizone images of objects by the steps of converting the image of an object into an image of its spatial-frequency spectrum conveying information on spatial structure of the object and separating in the spectrum at least one zone whose radiant flux is integrated in real-time to produce video signals of the respective object image. Arranged successively in a multizone system ahead of a spectrum separator means are a spatial-time modulator and an optical means for converting the image of the object into the image of the spatial-frequency spectrum.

1 Claim, 4 Drawing Figures

METHOD OF OBTAINING MULTIZONE IMAGES OF OBJECTS AND MULTIZONE SYSTEM THEREFOR

FIELD OF THE INVENTION

The present invention relates to apparatus for obtaining images of objects and in particular to methods of obtaining multizone images of objects and a multizone system therefor.

The invention may be used to advantage for exploration of the Earth and other planets from space vehicles, and also for aerial observation of a ground surface by taking photographs.

PRIOR ART

Known in the art are photographic, television, phototelevision and optoelectronic methods of obtaining the image of an object of interest, which are used in exploring the Earth and other planets from a space vehicle, and also in taking aerial photographs of a ground surface. The foregoing methods can be used for obtaining information on distribution of the intensity of electromagnetic radiation within the field of the scanned object evaluated element by element in areas corresponding to an instantaneous field of view of scanners or spatial resolution of images obtained by the use of photographic and television systems (cf. "Space Exploration of Mineral Resources", T. A. Avanesov "Operational Means for Obtaining Cosmic Video Information in an Optical Range", Moscow, 1976, p. 24, in Russian).

A major disadvantage of the aforesaid methods is that the size of a resolution element limits the sizes of objects being photographed, and structural peculiarities of the objects are obscured by other information.

Also known in the art are methods of analyzing the spatial structure of objects while processing their images, which involve conversion of the images into spatial spectra thereof and separation of individual components of the spectra. However, such methods do not allow obtaining images characterizing spatial distribution of structural peculiarities of various objects. Another disadvantage is that the coordinates for obtaining such characteristics are not fixed. The foregoing methods have not been used for obtaining multizone images of objects such, for example, as the Earth (cf. "Space Exploration of Mineral Resources", Yu. M. Chesnokov "Photographic Methods of Exploring the Earth from Outer Space", Moscow, 1976, p. 16, in Russian).

Another known method of obtaining multizone images comprises the steps of optically scanning the terrain and dividing the obtained electromagnetic radiation from an object into different spectral zones, in each of which there is formed a corresponding image representative of the distribution of the intensity of electromagnetic radiation in a given zone within the field of the scanned object. A set of such images obtained in different zones of an electromagnetic spectrum permits analyzing spectral luminance characteristics of objects (cf. U.S. Pat. No. 3,829,218, 1974).

The foregoing method does not allow obtaining images enabling evaluation of spatial frequencies higher than the frequency corresponding to a resolution element of these images. On the other hand, the possibility of enhancing resolution of images obtained from outer space is limited by the capabilities of cameras, storage devices and apparatus for transmitting images over a radio channel, and also by the existing requirements for increasing the field of view along the line of flight of a flying vehicle. Furthermore, the information contained in the obtained images hinders visual identification of objects by judging structural peculiarities thereof.

Also known in the art are television and optoelectronic systems for obtaining the image of a ground surface from flying vehicles by scanning the terrain and furnishing a video signal proportional to the value of integral luminance within an instantaneous field of view (cf. "Space Exploration of Mineral Resources", A. D. Drohanov "Problems Relating to Recording and Displaying of Video Information", Moscow, 1976, p. 188, in Russian).

A major disadvantage of such systems is that the size of a resolution element corresponding to an instantaneous field of view of a camera limits the sizes of objects whose images are obtained, and structural peculiarities of the objects are obscured by other information.

Another known multizone photographing scanner system is used with Landsat satellites exploring mineral resources and also with aircraft (cf. U.S. Pat. No. 3,829,218, 1974). The system comprises an optical apparatus for scanning the terrain, a lens with a field diaphragm for forming an instantaneous field of view, an optical device for breaking up radiation into zones of an electromagnetic spectrum, and light detectors furnishing video signals and having different spectral sensitivity, said optical device being arranged after said optical means and said lens.

However, the foregoing system does not allow obtaining information on the various details of the spatial structure of objects, which are smaller than the resolution element of the system corresponding to its instantaneous field of view, another disadvantage resides in that spatial distribution of structural peculiarities is obscured in the obtained image by the spatial distribution of luminance.

BRIEF SUMMARY OF THE INVENTION

It is an object of the present invention to provide a method of obtaining multizone images of objects, which enables formation of such multizone images whose resolution elements convey information the the characteristic of spatial structure of a corresponding area with detailedness exceeding the size of the area.

Another object of the invention is to provide a multizone system for obtaining images of objects, which features an enhanced object recognition capability.

The foregoing objects are accomplished by a method of obtaining images of objects by uninterruptedly optically scanning an object whose image is to be obtained and simultaneously forming a radiant flux from each portion of the object corresponding to an instantaneously scanned field of view and forming the image of the the object. The image of the object is converted into an image of a spatial-frequency spectrum conveying information on spatial structure of the object. The spatial frequency spectrum is separated into zones and the varying intensity of the radiant flux corresponding to the various zones is detected and measured and the radiant flux in each zone is integrated in real time. While the image of the object is being converted into a spatial-frequency spectrum the radiant flux from which the image of the object is formed is divided and the image of the object is simultaneously formed into an image of an electromagnetic spectrum. The electromagnetic spectrum is separated into zones and the varying spectral radiant intensity of the radiant flux corresponding to these latter zones is detected and measured. The radiant flux in these zones is likewise integrated in real time. From this integrated flux corresponding spatial and multispectral video signals are developed synchronized with the scanning of the field of view. The spatial video signals are coded in different colors in accordance with the corresponding multispectral video signals so as to form a color representation of the spatial and multispectral content of the object.

Prior to scanning it is of advantage to form the image of the object on an intermediate medium representing spatial structure of the object.

The method forming the subject of the invention permits representing the structural characteristics with detailedness exceeding the dimensions of image elements and simplifying the processes of identifying and interpreting photographed objects by analyzing their structural characteristics. It also enables obtaining only useful information on the structure of the photographed objects whereby its total amount in storing the images, transmitting them over radio channels and in digital processing thereof is reduced, accordingly.

A multizone system for obtaining images of objects comprising elements arranged successively in the direction of a radiant flux from an object, namely a scanner with a lens, a means for breaking up an object radiation spectrum into a plurality of zones, integrating light detectors for each zone and an image recorder, wherein the scanning and image-recording operations are performed in synchronism, according to the invention, includes a spatial-time modulator converting an intermediate image from a noncoherent to a coherent image and optical means converting the image of the object into an image of a spatial-frequency spectrum, the modulator and the optical means are successively arranged ahead of the means for breaking up the spectrum.

It is advantageous that the integrating light detectors should have similar spectral sensitivity.

After the scanner it is possible to install a device for branching the radiant flux. Preferably a dispersing optical element for decomposition of radiant energy into an electromagnetic spectrum and respective light detectors for each predetermined region of the electromagnetic spectrum are successively arranged in the direction of the branched flux.

The hereinproposed multizone system enables formation of a novel image, each resolution element of which represents the characteristics of spatial structure of a respective area within predetermined zones of a spatial spectrum with detailedness exceeding the size of said area. Novel identification properties of such an image make it possible to substantially widen the scope of problems solved by the use of remote techniques.

BRIEF DESCRIPTION OF THE DRAWINGS

The other objects and advantages of the present invention will become apparent from the discussion of preferred embodiments thereof, taken in conjunction with the accompanying drawings, wherein.

DESCRIPTION OF THE PREFERRED EMBODIMENTS

Consider now, by way of example, the hereinproposed method of obtaining images when used in remote exploration of the Earth from a space vehicle.

The method forming the subject of the present invention is accomplished in the following manner. An object (terrain) is scanned from a flying space vehicle. Simultaneously there is formed an image of each current fragment or instantaneous image of the object corresponding to an instantaneous field of view. Also, an image of each fragment of the scene is formed on an intermediate medium.

The intermediate medium may comprise any suitable photographic material, a photothermoplastic film or a semiconductor layer.

The intermediate medium is subjected to an incident beam of coherent light and optically converted into a spatial-frequency spectrum. Desired zones are separated in the spectrum image plane and the radiation is integrated to obtain a video signal.

Figure 1:
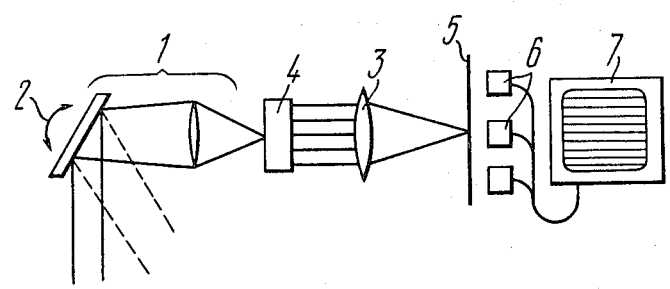
FIG. 1 is a functional diagram illustrating the use of a method for obtaining multizone images according to the invention.

FIG. 1 is a functional diagram illustrating the use of the hereinproposed method.

Referring to the drawing an optical scanner system 1 with a swivel mirror 2 scans a scene or field of view. An optical system 3 with a spatial-time light modulator 4 performs a Fourier transform of. Division into zones is accomplished by masks 5 in the spatial spectrum plane. Light detectors 6 furnish a video signal fed to a TV-display system 7. In the preferred embodiment of the invention a modulating medium in the spatial-time modulator represents a ferroelectric crystal producing an electro-optical effect.

The scanning and image-recording operations are performed in synchronism.

The spatial-frequency spectrum may be formed by different methods. For example, it may be obtained by placing an image on a transparent base directly in front of a collecting lens and applying a parallel coherent laser beam thereto. In the focal plane of the lens there occurs the formation of the spatial-frequency spectrum, i.e., of the weights of the sets of harmonic lattices whose superposition yields the image of the object. The spectrum is generally symmetrical with respect to the optical axes of the lens. An increase in the frequency of a spatial harmonic in the spectrum is proportional to the distance from the point of symmetry. Harmonics of one frequency but of opposite direction are located along the same circumference in the spectrum. Thus, by separating a zone of the assigned frequency in the form of a ring (or a semiring considering symmetry of the spectrum) in the spectrum it is possible to evaluate the presence of a corresponding harmonic in formation of the spatial structure of an object and, in effect, to characterize structural peculiarities pertaining to, say, rough seas or the age of wood. The elements of images having a line structure are discriminated by the use of radial or diametrical zones. This is done to characterize lineament structure of fractures, a road system, traces of sailing ships in the ocean and like objects.

Representing evaluations of the changing effect of harmonics of different frequencies in the form of an image permits characterizing spatial distribution thereof and determining at the same time the coordinates of anomaly observed in the photograph plane. The obtained image is, in fact, a novel image. Optical density variations on the photograph are representative of a varying spatial structure in the frame field and not of changing luminance of objects as in the case of prior art methods.

A portion of radiation obtained in scanning a scene is branched by the use of a translucent mirror and decomposed thereafter into an electromagnetic spectrum. Light detectors separating each corresponding interval of wavelengths are positioned in the plane of said spectrum whereby the available information on spatial structure of the object will be supplemented by information on its spectral brightness, a feature enhancing a recognition capability.

To obtain optimum contrast characteristics of objects on photographs with a view to facilitating their recognition, the image is formed from a line combination of video signals, i.e., as an algebraic sum of video signals produced in different zones of the spectrum. For example, to obtain a maximum contrast of objects on the image, line combinations of signals are made to correspond to main components of the set of characteristics of the objects observed in the used zones of the spectrum. This increases separation of low-contrast objects on the photograph due to the accumulation of luminance differences.

To obtain a colour-code image, one of the zones (or zone combinations) is made red, a second one green and a third one blue by displaying the image on a colour picture tube or projecting appropriate slides onto the screen. The obtained image is fixed on a colour photographic material or printed by a suitable method. As a result, the reliability of recognizing objects is enhanced due to the utilization of colour differences and a reduced effect of varying luminance of objects.

The scene may be photographed with a fairly high spatial resolution exceeding considerably the resolution of the required image. The obtained photograph is scanned by a spot with prechosen resolution, after which the image is formed in the above manner. This permits making frequency and weight requirements for the given scanner system less stringent. Also, the scanning of the terrain and formation of image video signals may be accomplished at different times. Besides, the photogrammetric properties of the photograph are preserved so that it may be used for measuring purposes.

It should be stressed that a considerable difference exists between photographs made by prior art methods and by the hereinproposed method with the same spatial resolution on the terrain. A photograph made by the hereinproposed method has quite a number of peculiar features as compared with a conventional photograph. More specifically, it distinctly reveals beds of large rivers, which is important in hydrographic surveying. In the photographs obtained by the novel method resolution of medium-size rivers is increased two times (upstream). They also reveal valleys of meandering rivers, the area of Mesozoic class lakes and other objects.

Figure 2:
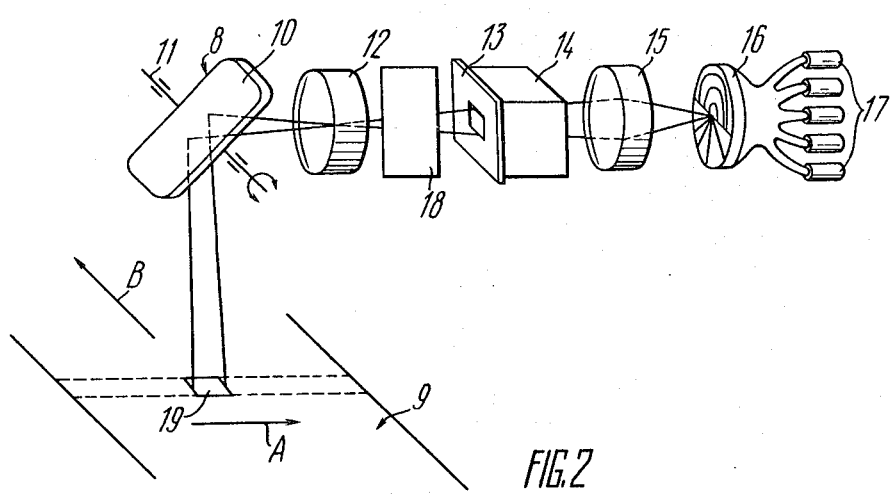
FIG. 2 is a diagram of a multizone system for obtaining an image in accordance with the invention.

In accordance with the invention the multizone system for executing the hereinproposed method comprises an optical scanner 8 (FIG. 2) for optically scanning a scene or field of view 9 across the line of flight of the space vehicle. Stated differently, the scanning is accomplished along the arrow A perpendicular to the line of flight (arrow B). The scanning is transversely of the flight path. The scanner assembly of the apparatus comprises a mirror 10 rotating on a shaft 11 parallel to the line or path of flight over the terrain. A lens 12 is installed after the optical scanner 8. However, the lens may also be placed in front of the mirror 10. In the case of two optical assemblies the mirror 10 may be positioned therebetween.

Arranged in the direction of a radiant flux after the lens 12 is a diaphragm 13 forming a field of view and then a spatial-time modulator 14 converting an intermediate image from a noncoherent to a coherent image and an optical device converting the image of the object or field of view into an image of a spatial-frequency spectrum. The optical device is represented by lens 15 forming in its focal plane the spatial-frequency spectrum of the image of an instantaneous field of view. Arranged after the lens 15 is a device 16 for effecting optical division of the image into zones. Integrating light detectors 17 providing video signals of corresponding zones are located at the output of the optical division device 16. The light detectors 17 each have similar characteristics. To increase light sensitivity of the system, an image tube 18 enhancing image brightness is positioned after the lens 12.

The hereinproposed system operates in the following manner. The entire equipment accommodated on a flying vehicle is displaced linearly and uniformly with respect to the ground path. The scanning mirror 10 rotating on the shaft 11 scans a scene perpendicular to the line of flight. When one line is scanned, the flying vehicle covers a distance equal to the width of a strip 19 of the scene 9 corresponding to the line. The lens 12 forms an image in the plane wherein the intermediate image of the modulator 14 is formed, the modulator being used to convert a noncoherent image into a coherent image. The size of the image is limited by the diaphragm 13. The obtained images are converted into coherent radiation forming a parallel beam in the direction of propagation and intensity-modulated across the luminance-distribution beam in the original image. The lens 15 converts the beam into the spatial-frequency spectrum of the modulating image. The device 16 effecting optical separation divides the radiation in the spectrum plane into a plurality of zones corresponding to assigned spatial frequency ranges in the from of a semicircle or circumferences in the spectrum plane or as radial zones in the given direction. The device 16 may be made as a fiber optic bundle structure. Installed at the output of the fiber bundles are the light detectors 17 which integrate the radiant flux within the assigned zones.

The system forming the subject of the present invention allows obtaining an image, each resolution element of which is representative of a peculiar spatial structure of a respective area in the assigned region of spatial frequencies with detailedness exceeding the size of the area. The formed image possesses novel recognition properties attributable to peculiarities of spatial structure of objects, a feature substantially widening the scope of problems solved by remote techniques. The maximum effect is attained in remote surveying of fields wherein the structure of an object is of principal value, say, in prospecting geology, geomorphology, oceanography, meteorology, forest management, and morphological study of landscapes.

The multichannel system in accordance with the invention also includes means for breaking up a radiant flux, said means is shown as a translucent mirror 20

Figure 3:
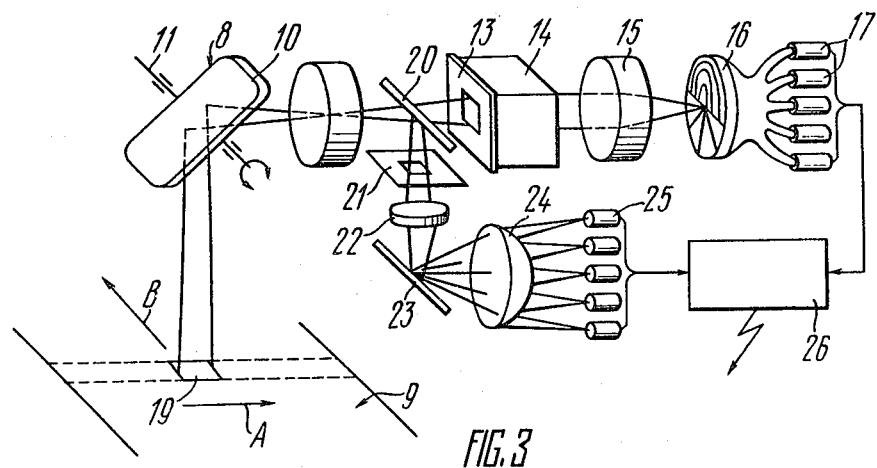
FIG. 3 is a diagram of a multizone system for obtaining an image with a device for separating a radiant flux in accordance with the invention.

(FIG. 3). Arranged successively in the direction of the branched or divided flux are a diaphragm 21 designed to limit a field of view, a lens 22, a dispersing optical element 23 for decomposition of radiation into an electromagnetic spectrum, a means 24 for dividing the spectrum into regions, and integrating light detectors 25 for each predetermined region of the electromagnetic spectrum. The light detectors 25 have different spectral sensitivity.

The scene 9 is scanned across the line of flight by the mirror 10. The lens 12 forms an image limited by the field diaphragm 13, which is divided into two channels by the translucent mirror 20. In the first channel a light beam is decomposed into an electromagnetic spectrum wherein the separated zones are integrated by the light detectors 25 having different spectral sensitivity. In the second channel the image is converted into a spatial-frequency spectrum wherein the zones are integrated by the light detectors 17 having essentially similar characteristics. The obtained video signals are transmitted over a radio channel 26 to a phototelevision display system (not shown in the drawing).

The distribution of energy among the zones of a spatial-frequency spectrum is a distinctive feature chracterizing ground objects which may not be otherwise recognized, specifically by spectral luminance.

Photographs taken in different zones of the electromagnetic spectrum permit obtaining data primarily on physical-chemical properties of a ground object surveyed from space. On the other hand, space spectroregional photographs allow obtaining information on geological structure of the object of interest with detailedness appreciably exceeding spatial resolution of video information transmitted from a space vehicle to the Earth. The obtained spatial and spectroregional information is processed by essentially the same methods and techniques which are used in taking photographs in different zones of the electromagnetic spectrum. It should be stressed that distribution of energy in different zones of the spatial-frequency spectrum, in much the same manner as distribution of spectral brightness, is a distinguishing feature which is easily formalized to enable automatic interpretation of aerospace photographic data at a processing stage. Black-and-white spatial-spectroregional photographs may be used to synthesize colour images.

Figure 4:
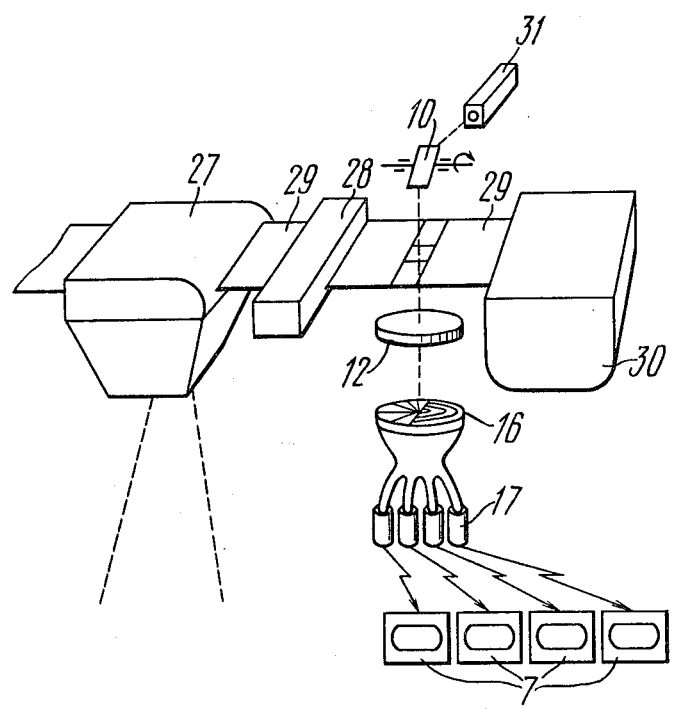
FIG. 4 is a diagram of a multizone system with a data storage unit in accordance with the invention.

To enable solution of photogrammetric problems pertaining to the exploration of the Earth and also to accurately preserve the geometry of the prospected object and make the requirements for a scanner less stringent, the multizone system in compliance with the invention incorporates a phototelevision unit designed to photograph and display an intermediate image with a high degree of detailedness. The phototelevision unit includes a camera 27 (FIG. 4), a system 28 for automatic processing of an image-recording medium 29, which is located after the camera 27, and a data storage unit 30. The data storage unit 30 may be arranged in front of the system 28 to expedite the photographing process.

The camera 27 and the automatic processing system 28 are used to obtain an intermediate image of the photographed object, which has high spatial resolution. A laser 31 and the swivel mirror 10 are used to scan the image with an aperature considerably exceeding the resolution element of the original image and corresponding to the resolution element of novel images obtained by the use of the hereinproposed method. Thereafter the system will operate in the above manner.

The invention permits obtaining photographs possessing high measuring properties with the central projection preserved. Such photographs are suitable for photogrammetric and stereogrammetric processing. They may be used in mapping operations involving the use of aerogeophysical facilities. The presence of the original image on an intermediate medium permits accomplishment of repeated scanning in various operating modes to allow preliminary evaluation and selection of the mode in transmission of images from automatic sondes to the Earth.

What is claimed is:

1. A method of obtaining multizone images of objects comprising the steps of uninterruptedly optically scanning an object whose image is to be obtained and simultaneously forming a radiant flux from each portion of said object corresponding to an instantaneously scanned field of view, and forming the image of the object, converting said image of said object into an image of a spatial-frequency spectrum conveying information on spatial structure of the object, separating into zones said spatial frequency spectrum and detecting and measuring the varying intensity of radiant flux corresponding to the various zones and integrating the radiant flux in each zone in real-time, while converting the image of said object into a spatial-frequency spectrum dividing the first-mentioned radiant flux and converting the image of said object into an image of an electromagnetic spectrum, separating into zones said electromagnetic spectrum and detecting and measuring the varying spectral radiant intensity of radiant flux corresponding to the various last-mentioned zones and integrating the radiant flux in each last-mentioned zone in real time, developing thereby corresponding spatial and multispectral video signals synchronized with the scanning of said field of view, and coding the spatial video signals with different colors in accordance with the corresponding multispectral video signals so as to form a color representation of the spatial and multispectral content of the object.

* * * * *